United States Patent [19]
Richley et al.

[11] Patent Number: 5,101,417
[45] Date of Patent: Mar. 31, 1992

[54] PHASE CONTROLLED SYNCHRONIZATION FOR DIRECT SEQUENCE SPREAD-SPECTRUM COMMUNICATION SYSTEMS

[75] Inventors: Edward A. Richley, Mountain View; Richard M. Barth, Palo Alto, both of Calif.

[73] Assignee: Xerox Corporation, Stamford, Conn.

[21] Appl. No.: 546,456

[22] Filed: Jun. 29, 1990

[51] Int. Cl.$^5$ .......................................... H04L 27/30
[52] U.S. Cl. .......................................... 375/1; 380/34; 370/18; 375/120
[58] Field of Search ................. 375/81, 119, 120, 115, 375/1; 370/18; 380/34

[56] References Cited

U.S. PATENT DOCUMENTS 4,638,494  1/1987  Kartchner et al. ................. 375/115

OTHER PUBLICATIONS

Ziemer et al, *Digital Communications and Spread Spectrum Systems*, (MacMillan, New York; 1985; pp. 312–314).

Primary Examiner—Bernarr E. Gregory

[57] ABSTRACT

A receiver for a direct sequence spread-spectrum communication system of the type in which a transmitter mixes a clocked pseudo-random sequence with a modulated carrier for spreading the carrier energy across a wide band of frequencies, comprises a resident clock-driven pseudo-random code generator for locally generating an essentially identical, spectrum despreading code sequence; means for clocking the resident code generator at a nominal frequency which is offset in a predetermined sense from the clock frequency of the transmitted code sequence such that the phase of the locally generated code sequence tends to slide in one direction with respect to the phase of the transmitted code sequence; detection means for determining whether the locally generated and the transmitted code sequence are phase aligned or misaligned and for sensing their actual, incipient and/or predicted departures from a phase aligned state, and phase control means for adjusting the clock frequency for the resident code generator whenever such a departure is sensed, thereby shifting the phase of the locally generated code sequence in the opposite direction with respect to the transmitted code sequence by an amount which tends to restore the two code sequences to a phase aligned state.

11 Claims, 4 Drawing Sheets

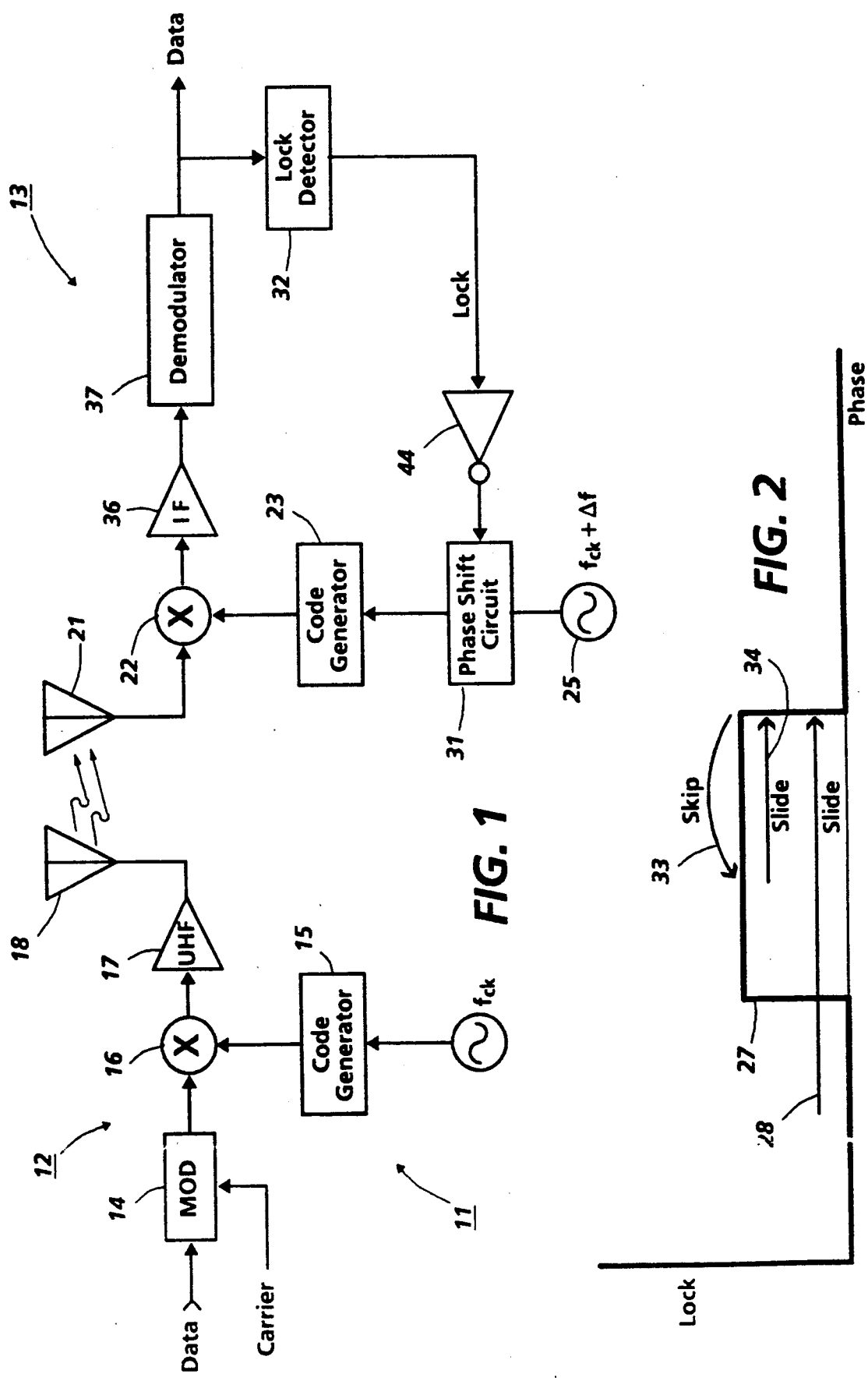

PHASE CONTROLLED SYNCHRONIZATION FOR DIRECT SEQUENCE SPREAD-SPECTRUM COMMUNICATION SYSTEMS

FIELD OF THE INVENTION

This invention relates to direct sequence spread-spectrum communication systems and, more particularly to new and improved methods and means for synchronizing them. More specifically, this invention pertains to synchronization techniques which reduce the amount of power that is consumed by the receivers of direct sequence spread-spectrum communication systems.

BACKGROUND OF THE INVENTION

As pointed out in my copending and commonly assigned U.S. patent application, which was filed Dec. 28, 1989 under Ser. No. 07/459059 on "Transmitted Code Clock Code-Matching Synchronization for Spread-Spectrum Communication Systems" (D/89523) and which hereby is incorporated by reference, spread-spectrum communication systems are superior to ordinary narrow band systems in several important respects. For example, they have greater immunity to narrow band noise, and they are less likely to cause narrow band interference. Furthermore, they provide increased "unencrypted" security against unauthorized eavesdropping because conventional narrow band signal detectors are illsuited for separating spread-spectrum signals from the usual background or "floor" noise.

Frequency bands of 902 MHz–928 MHz, 2400 MHz–2483.5 MHz and 5725 MHZ–5850 MHz were allocated a few years ago for license-free spread-spectrum communications at transmitted power levels of up to one (1) watt, subject to certain restrictions on the distribution of the sideband energy. That action is likely to promote the commercial use of this technology for short range radio communications.

To carry out so-called "direct sequence" spread-spectrum communications, a transmitter characteristically mixes a cyclical pseudo-random code sequence with an information modulated carrier signal, thereby "spreading" the spectrum of the transmitted signal energy generally uniformly across a wide band of frequencies. The transmitter can utilize any of several well known modulation techniques for impressing baseband information on the carrier, including frequency modulation (FM), frequency shift keying (FSK), phase modulation (PM), and phase shift keying (PSK). For recovering the baseband information from a incoming spread-spectrum signal of the foregoing type, a receiver first mixes the incoming signal with a locally derived or a locally generated pseudo-random code sequence which is substantially synchronized with the transmitted code sequence, thereby "despreading" the signal spectrum to recover the carrier. A suitable demodulator then demodulates the carrier to recover the baseband signal.

Various synchronization processes have been developed for synchronizing a code generator residing at a receiver of such a system with the code generator at the transmitter. However, the following discussion is directed toward so-called "carrier lock tracking." As is known, carrier lock tracking is an attractive technique for synchronizing direct-sequence spread-spectrum communication systems, especially for applications in which it is necessary or desirable to utilize "code-division multiplexing" for sharing the available frequency spectrum among multiple user groups who might engage in time overlapping communications.

Carrier lock tracking-type synchronization is based on the premise that all receivers for which a given transmission is intended have a priori knowledge of the spectrum spreading code sequence for that particular transmission. In keeping with that premise, the transmitter and each of the participating receivers are equipped with respective clock-driven pseudo-random code generators which generate essentially identical pulse code sequences. At the outset of a communication session, the phase relationship between the code sequence that is being locally generated at a given receiver and the transmitted code sequence arriving at that receiver is arbitrary and undefined. For that reason, each of the receivers typically is initialized by a sliding correlator which phase aligns its locally generated code sequence with the transmitted code sequence. More particularly, until the receiver determines that its locally generated code sequence is phase aligned with the transmitted code sequence, its local code generator is clocked at a frequency which is offset slightly from the frequency at which the transmitted code sequence is clocked. This causes the relative phase of the transmitted and locally generated code sequences to vary, preferably at a rate which is sufficiently slow to enable their phase alignment to be detected within the time required for their relative phase to shift by a single code bit (i.e., the time span of the so-called "correlation window"). When such a phase correlation is detected, the receiver adjusts the clock frequency for its local code generator, thereby causing it to be synchronously clocked at essentially the same frequency as the transmitted code sequence for the remainder of the communication session.

To implement carrier lock tracking, the clock frequency for the transmitted code sequence usually is selected to be a submultiple of the carrier frequency, whereby each the receivers can utilize a suitable frequency divider for deriving the synchronous clock frequency for its local code generator from the carrier signal it recovers. In other words, each of the receivers typically relies upon a sliding correlation process for finding "carrier lock," and a carrier detection/frequency division process for maintaining lock. Unfortunately, however, this tends to cause the receivers to consume substantial amounts of power, especially in systems which are designed to operate at high frequencies, such as at the UHF frequencies which have been allocated for license-free spread-spectrum radio communications. Clearly, power consumption is a significant issue, particularly for systems having battery powered receivers, such as might be found in portable computers having spread-spectrum communication links, because the receivers generally are powered-up more or less continuously to operate in a standby state pending the arrival of a transmission. Moreover, straightforward frequency division is feasible for recovering the synchronous clock frequency from the carrier only if there is a harmonic relationship between the clock frequency and the carrier frequency, which sometimes is an unattractive design constraint.

Accordingly, it will apparent that there is a need for methods and means for synchronizing direct-sequence spread-spectrum communication systems, including systems that are compatible with the use of code-division multiplexing, for applications in which it is necessary or desirable to significantly reduce the power consumption of the receivers. Moreover, it will be evident that it would be beneficial for designers to have the freedom to select the carrier frequencies and the code clock frequencies for such systems independently of each other. As will be seen, the invention described and claimed in my aforementioned copending and commonly assigned patent application addresses similar needs, but it will be evident that this invention and my prior invention provide significantly different responses to those needs.

SUMMARY OF THE INVENTION

In accordance with the present invention, a receiver for a direct sequence spread-spectrum communication system of the type in which a transmitter mixes a clocked pseudo-random sequence with a modulated carrier for spreading the carrier energy across a wide band of frequencies, comprises a resident clock-driven pseudo-random code generator for locally generating an essentially identical, spectrum despreading code sequence; means for clocking the resident code generator at a nominal frequency which is offset in a predetermined sense from the clock frequency of the transmitted code sequence such that the phase of the locally generated code sequence tends to slide in one direction with respect to the phase of the transmitted code sequence; detection means for determining whether the locally generated and the transmitted code sequence are phase aligned or misaligned and for sensing their actual, incipient and/or predicted departures from a phase aligned state, and phase control means for adjusting the clock frequency for the resident code generator whenever such a departure is sensed, thereby shifting the phase of the locally generated code sequence in the opposite direction with respect to the transmitted code sequence by an amount which tends to restore the two code sequences to a phase aligned state. In other words, in keeping with this invention, the receiver has a sliding correlator for phase correlating its locally generated code sequence with the transmitted code sequence at the outset of each incoming transmission, together with a phase controller for regulating the rate at which its resident code generator is clocked once such phase correlation has been achieved, whereby the resident code generator of the phase correlated receiver is clocked at substantially the same average frequency as the transmitted code sequence for the balance of the transmission.

BRIEF DESCRIPTION OF THE DRAWINGS

Additional features and advantages of this invention will become apparent when the following detailed description is read in conjunction with the attached drawings, in which:

FIG. 1 is a simplified block diagram of a spread-spectrum communication system embodying the present invention;

FIG. 2 is a lock/phase diagram for a receiver which is synchronized by phase-slip locking in accordance with this invention;

DETAILED DESCRIPTION OF THE ILLUSTRATED EMBODIMENT

Figure 3:
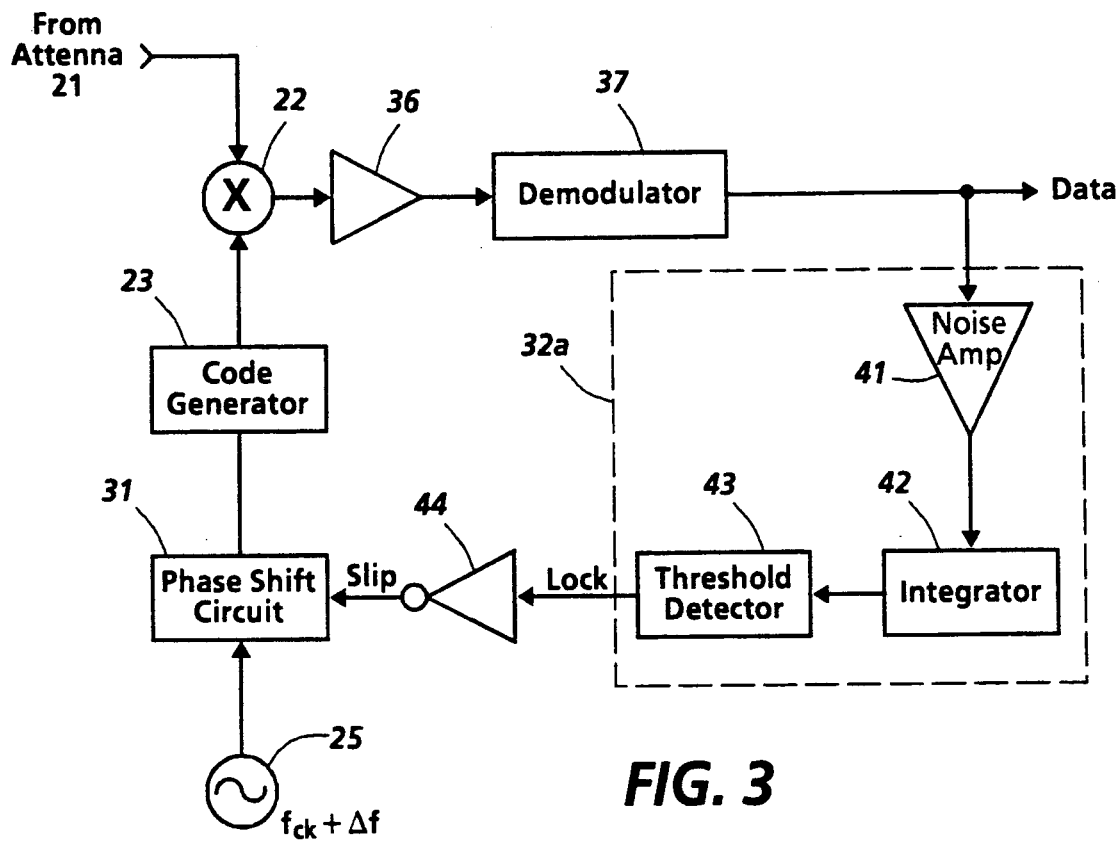
FIG. 3 is a functional schematic diagram of a noise sensitive lock detector.

While the invention is described in some detail hereinbelow with specific reference to certain embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIG. 1, it will be seen that there is a direct sequence spread-spectrum communication system 11 comprising a transmitter 12 and at least one receiver 13. In keeping with accepted practices, the transmitter 12 includes a modulator 14 for modulating a carrier signal in accordance with a baseband data signal, together with a clock-driven pseudo-random code generator 15 for supplying a cyclical pseudo-random pulse code sequence having a phase which varies at a predetermined clock frequency, $f_{ck}$. A doubly balanced mixer 16 is coupled to the modulator 14 and to the code generator 15 for mixing the pseudo-random code sequence with the modulated carrier, thereby spreading the carrier signal energy across a wide band of frequencies. This "spread-spectrum" signal typically is amplified by a UHF amplifier 17 prior to being radiated by an antenna 18.

At the receiver 13, an antenna 21 receives the radiated spread-spectrum signal and applies it (or an amplified version of it) to a doubly balanced mixer 22 where it is mixed with a pseudo-random pulse code sequence which is supplied by a local clock-driven pseudo-random code generator 23. The local code generator 23 essentially replicates the transmitted code sequence, but the phase relationship of the transmitted and locally generated code sequences initially is arbitrary and undefined. Therefore, in accordance with the present invention, the receiver 13 includes a clock pulse generator 25 for clocking the local code generator 23 at a nominal frequency, $f_{ck}+\Delta f$, which is offset in a predetermined direction from the clock frequency, $f_{ck}$, of the transmitted code sequence. As shown in FIG. 2, this causes the relative phase of those two code sequences to slide into a correlation window 27 from a known direction, as indicated by the arrow 28, thereby phase aligning them at the outset of each communication session to a precision of about one code bit (i.e., the width of the correlation window 27).

In keeping with this invention, a phase control circuit 31 is coupled between the code generator 23 and the clock pulse generator 25 for regulating the frequency at which the code generator 23 is clocked under the control of a lock detector 32. The lock detector 32 maintains the phase control circuit 31 in an idle state while the transmitted and locally generated code sequences are being brought into phase alignment as described above, but it detects the phase alignment or "lock" of those two code sequences while their relative phase is within the correlation window 27. That enables the lock detector 32 to trigger the phase control circuit 31 to restore the lock whenever it detects an actual or incipient loss of synchronism.

More particularly, it will be understand that the clock frequency offset bias, $\Delta f$, causes the relative phase of the transmitted and locally generated code sequences to tend to slide in a predetermined direction, both before and after synchronism is achieved. Therefore, the phase control circuit 31 restores the lock by either advancing or retarding the phase of the clock pulses that are applied to the code generator 23 as required to cause the relative phase of the transmitted and locally generated code sequences to "slip" back into the correlation window 27 from the opposite direction, as indicated by the arrow 33 in FIG. 2. In other words, after the transmitted and locally generated code sequences are phase aligned with each other at the outset of a communication session, the lock detector 32 causes the phase control circuit 31 to modulate the rate at which the code generator 23 is clocked, thereby causing it to be clocked at the same average frequency as the code generator 15 at the transmitter 11 for the balance of the session. Substantial synchronism is achieved, without requiring the receiver 13 to capture or otherwise duplicate the clock frequency of the transmitted code. This means that the carrier frequency and the clock frequency may be selected independently of each other.

Considering the synchronism that is achieved in some additional detail, it will be understood that instantaneous differences between the clock frequencies of the "phase aligned" transmitted and locally generated code sequences cause their relative phase to oscillate back and forth in the immediate vicinity of the correlation window 27, as indicated in FIG. 2 by the arrows 33 and 34. The relative phase of those two code sequences may actually slide slightly beyond the correlation window 27 before the lock detector 32 detects a loss of synchronism, but such excursions occur sufficiently infrequently and are of sufficiently short duration that the fidelity of the carrier signal that is recovered by the mixer 22 is only slightly degraded by them. In practice, the output of the mixer 22 typically is amplified by an IF amplifier 36 prior to being applied to a demodulator 37 which, in turn, demodulates the carrier to recover the baseband data.

As previously pointed out, embodiment of FIG. 1, the sense of the clock frequency offset bias, $\Delta f$, is a pre-established constant because it determines the direction in which the phase control circuit 31 is required to shift the phase of the clock pulses for the code generator 23 to perform its lock restoring or re-phasing function. However, there is a substantial tolerance on the magnitude of this bias. Specifically, the magnitude of the offset bias preferably is limited to cause the relative phase of the transmitted and locally generated code sequences to dwell within the correlation window 27 (FIG. 2), without any restorative action being taken, for an adequately long time to enable the lock detector 32 to detect their phase alignment. The time required for performing this detection function is dependent on the bandwidth of the receiver 13 and on the response time of the lock detector 32. As a practical matter, however, the response time, $\tau$, of the lock detector 32 usually is the dominant factor, so the magnitude of the offset bias, $\Delta f$, typically is limited so that $\Delta f \leq 1/\tau$. For example, if the lock detector 31 has a response time, $\tau$, the order of 100 $\mu$sec, this strong inequality can be satisfied by off-setting the nominal clock frequency for the code generator 23 from the clock frequency of the transmitted code sequence by about 1 KHz.

The lock detector 32 may take several different forms. For example, as shown in FIG. 3, it may comprise a noise sensitive threshold detector 32a for triggering the phase control circuit 31 whenever the average noise level at the output of the demodulator 37 rises above a predetermined threshold level. To carry out such a detection function, the output of the demodulator 27 suitably is amplified by a noise amplifier 41 which has substantial gain outside the bandwidth of the baseband signal. An integrator 42 averages this amplified spurious, out-of-band signal energy (i.e., "noise") over a suitably long period of time to ensure that the average noise level is a reliable indication of whether the transmitted and locally generated code sequences are phase aligned or not. Thereafter, a threshold detector 43 compares the average noise level against a predetermined threshold level to provide a binary lock detect signal which transitions back and forth between a high ("1") logic level, "lock true", state and a low ("0") logic level, "lock false" state depending on whether the average noise level at the output of the integrator 42 indicates that the transmitted and locally generated code sequences are phase aligned or misaligned, respectively. Furthermore, as illustrated in FIG. 1, an inverter 44 inverts the lock detect signal, thereby providing a slip signal for triggering the phase control circuit 31 whenever the lock detect signal transitions from a high ("1") logic level, "lock true," state to a low ("0") logic level, "lock false" state (i.e., whenever the slip signal transitions from a low ("0") logic level to a high ("1") logic level). Those who are familiar with FM receivers will recognize that the lock detector 32a is similar to the mute or squelch control circuitry that is commonly found in such receivers.

Figure 4:
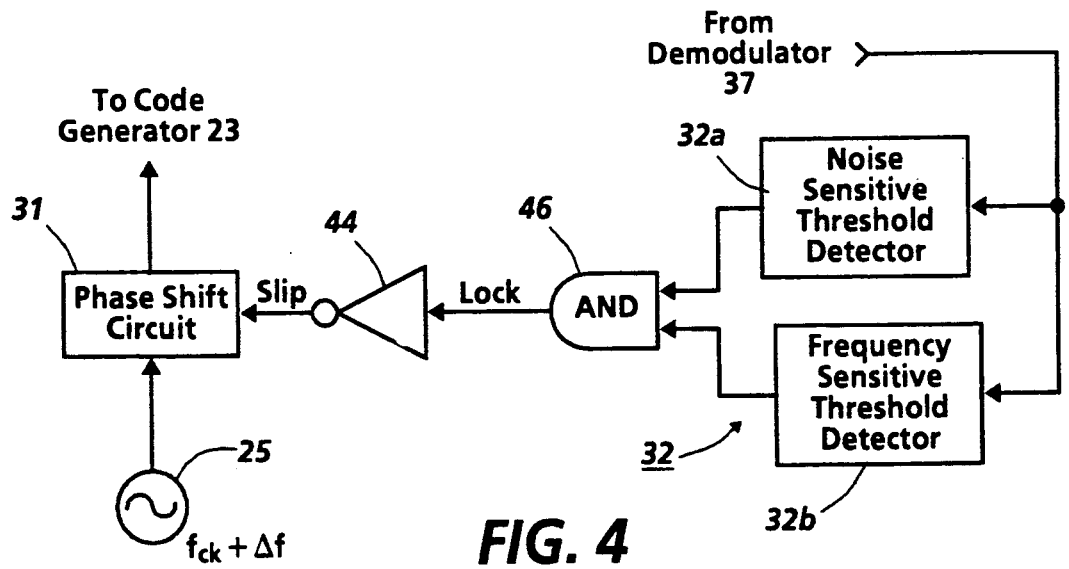
FIG. 4 is a simplified block diagram of a multi-mode lock detector for providing increased protection against false lock determinations.

Additional or alternative lock detection circuitry and techniques may be employed for improving the reliability and sensitivity of the lock detector 32. For instance, in synchronous digital data communication systems, all valid data transitions occur at a predetermined clock rate. Thus, systems of that type may include a frequency sensitive threshold detector 32b for triggering the phase control circuit 31 whenever the rate at which transitions occur in the signal appearing at the output of the demodulator 37 increases from the usual data clock rate to a significantly higher rate over a relatively small number of cycles (i.e., as few as two or three cycles typically is sufficient). If, as shown in FIG. 4, two or more lock detection means 32a and 32b are employed, the lock detect signals they supply advantageously are logically ANDED by an AND gate 46, so that the slip signal supplied by the inverter 44 triggers the phase control circuit 31 whenever any one of the lock detection criterion indicates that the transmitted and locally generated code sequences have drifted out of phase alignment. The goal, of course, is to reduce the duration of any erroneous lock indications, thereby reducing the amount of time the phase/control circuit 31 takes to restore the lock whenever it is lost. As a general rule, noise sensitive lock detection is a relatively reliable criterion for sensing a loss of lock, while frequency sensitive detection tends to be somewhat faster but less certain.

Depending on the sense of the offset bias, $\Delta f$, the phase control circuit 31 may be configured so that it either advance or retards the phase of the clock pulses for the code generator 23 when it is triggered by the lock detector 32. The phase control circuit 31 conceivably could be a VCO (voltage controlled oscillator) or the like (not shown) for adjusting the phase of the clock pulses for the code generator 23 under the control of the lock detector 32 (or even under the control of a suitable analog controller to provide even more precise control), but it will be assumed for purposes of the following examples that it is a phase retarding circuit.

Figure 5:
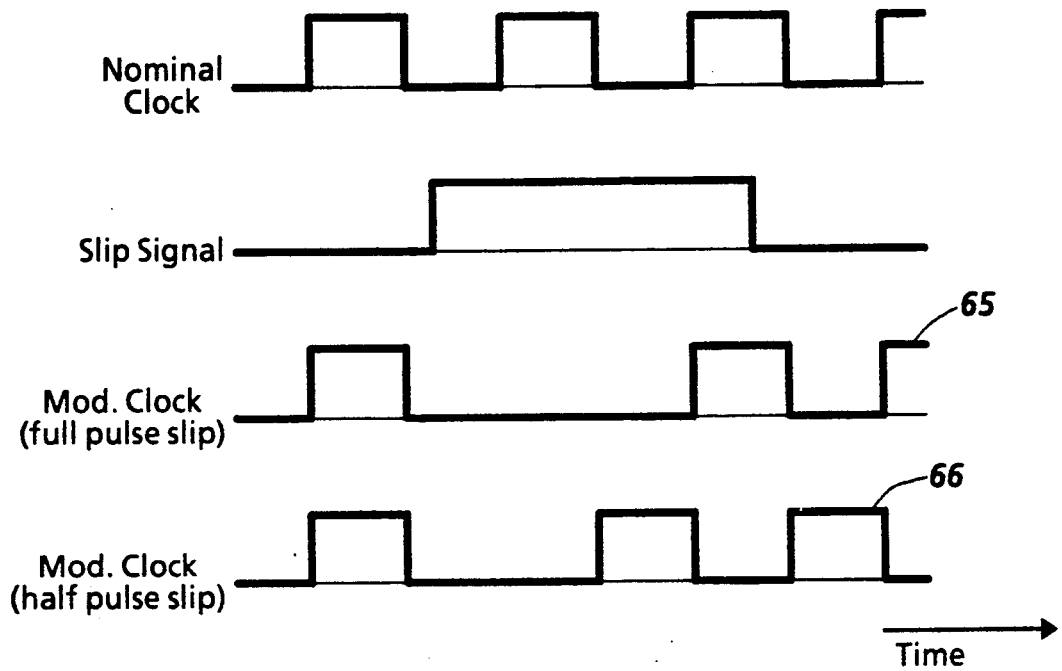
FIG. 5 is a timing diagram illustrating the phase-slip locking synchronization that is achieved in keeping with this invention when the phase of the clock pulses for the code generator residing within the receiver is slipped on demand by either a full clock pulse or a half clock pulse.

Keeping FIG. 1 in mind while turning to FIG. 5 for such examples, it will be understood that the above-stated assumption means that the code generator 23 for the receiver 13 nominally is clocked at a somewhat higher frequency than the code generator 15 at the transmitter 12. Consequently, the phase of the locally (i.e., receiver) generated code sequence advances relative to the phase of the transmitted code sequence, thereby causing the code sequences to "slide" into phase alignment with each other (see FIG. 2). When the lock detector 32 determines that those two code are phasealigned, it causes the lock detect signal to assume a high ("1"), lock true state, thereby causing the inverter 44 to pull the slip control signal down to a low ("0") logic level state. Subsequently, at some later time $t_1$ in FIG. 5, the lock detector 32 determines that the transmitted and locally generated code sequences have drifted out of phase alignment, so the lock detect signal becomes false ("0"), thereby causing the slip control signal to transition to a high logic level state ("1"). This positive-going transition in the slip control signal triggers the phase slip circuit 31, thereby causing it to retard the phase of the code sequence generated by the code generator 23 (i.e., the so-called locally generated code sequence). For example, the phase slip circuit 31 may retard the phase of the locally generated code sequence by deleting either a full clock pulse, as at 65 or a half clock pulse, as at 66, from the clock pulse train that is supplied by the clock pulse generator 21 prior to applying pulse train to the code generator 23. If finer corrective phase adjustments and/or phase adjustments of vaiable magnitude are desired, the pulse generator 21 may generate pulses at any integer multiple of the nominal clock frequency, so that the corrective adjustments may be made in smaller fractional parts of a clock cycle and in integer multiples of such fractional parts. As an example, if the output frequency of pulse generator 21 is twice the nominal clock frequency for the code generator 23, the corrective phase adjustments can be as fine as a quarter of a clock cycle.

Figure 6:
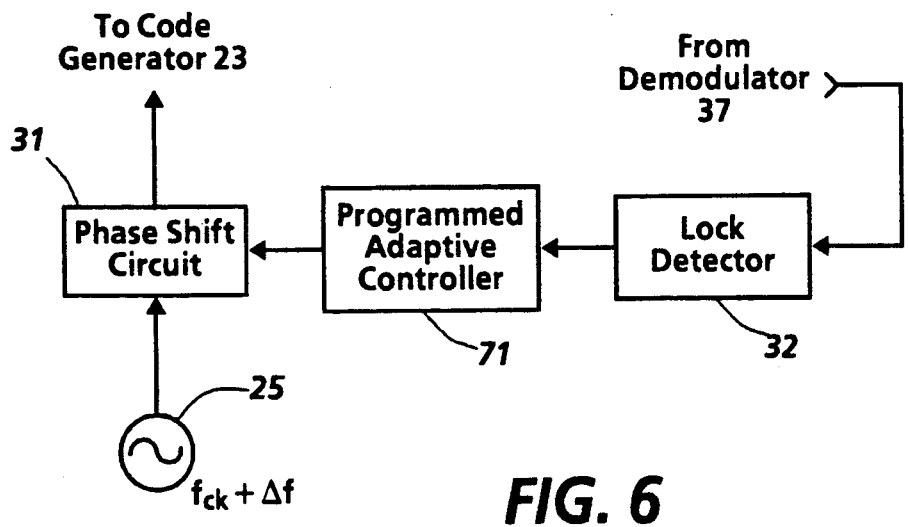
FIG. 6 is a functional block diagram of an adaptive clock frequency controller for carrying out predictive phase-slip locking synchronization.
Figure 7A:
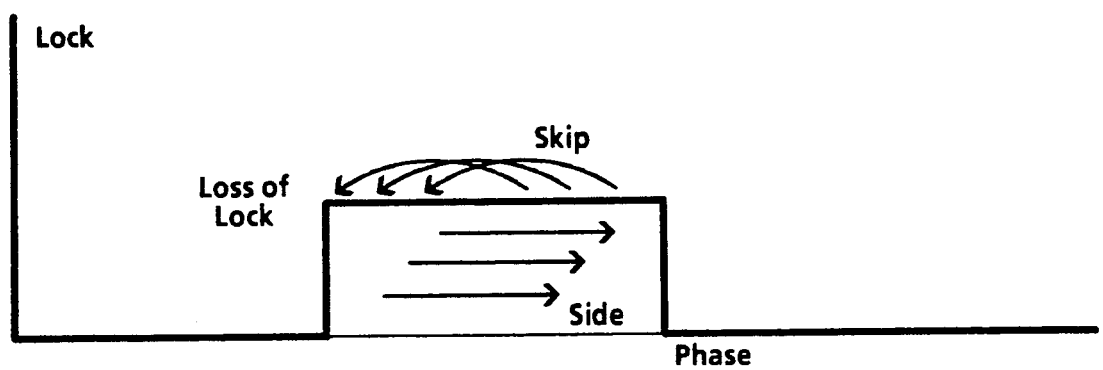
FIGS. 7A and 7B are lock/phase diagrams for a receiver synchronized by predictive phase slip locking when the predicted slip rate is too high and too low, respectively.
Figure 7B:
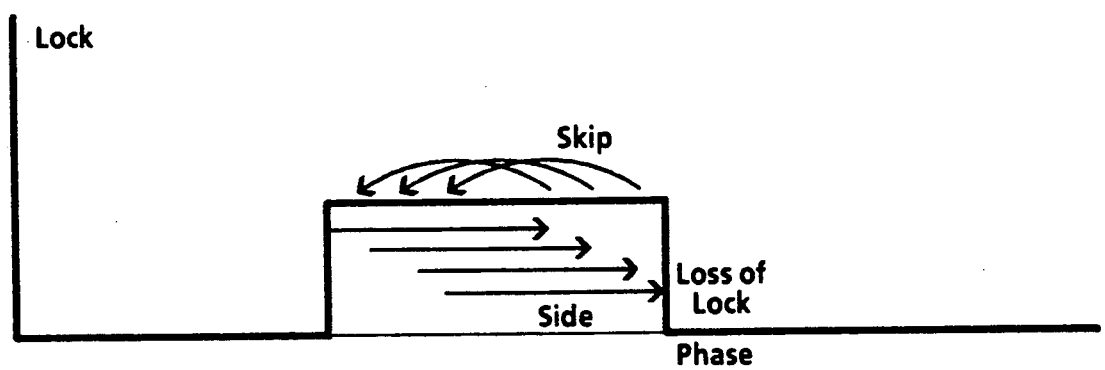

The slip-on-loss of lock synchronization that is contemplated by this invention can be refined to provide predictive phase corrections for prolonging the phase alignment of the transmitted and locally generated code sequences. To that end, as shown in FIG. 6, a programmed adaptive controller 71, such as a programmed microprocessor or a custom or semicustom logic circuit, may be included for triggering the phase control circuit 31 (FIG. 1) at a predicted slip rate which is forecast to compensate for the inherent tendency of the locally generated code sequence to slide out of phase alignment with the transmitted code sequence. If the predicted slip rate is too high or two low, the transmitted and locally generated code sequences will tend to slip or slide out of phase alignment over time, as shown in FIGS. 7A and 7B, respectively. Thus, a suitable lock detector 32 advantageously is included for restoring the lock whenever it is lost and for adaptively adjusting the predicted slip rate of the controller 71 to cause it to more accurately predict the frequency and/or magnitude of the incremental phase adjustments that are needed to maintain the locally generated code sequence in phase alignment with the transmitted code sequence.

CONCLUSION

In view of the foregoing, it now will be appreciated that the synchronization methods and means that this invention provides are well suited for direct sequence spread-spectrum communication systems of the type in which the receivers utilize locally generated pseudo-random code sequences for despreading the received signal spectrum. Thus, it will be apparent that the synchronization provided by this invention is compatible with the use of code-division multiplexing for sharing the available frequency spectrum among the parties to a plurality of different, potentially time overlapping communication sessions. Moreover, it will understood that such derive or otherwise duplicate the frequency at which the transmitted code sequence is being clocked, thereby avoiding the design contraints of existing carrier lock tracking synchronization techniques. Additionally, it will be evident that the "slip on actual and/or predicted loss of lock" synchronization which this invention contemplates is well suited for direct sequence spread-spectrum communications systems wherein the amount of power consumed by the receivers is of significant concern.

What is claimed:

1. A receiver for a direct-sequence spread-spectrum communication system; said system having a transmitter for mixing a predetermined cyclical psuedo-random pulse code sequence with a data modulated carrier signal for spreading said carrier across a substantial frequency spectrum such that said modulated carrier is transmitted to said receiver as a spread-spectrum carrier, said predetermined code sequence being stepped through a repetitive phase cycle at a substantially constant clock frequency; said receiver comprising pseudo-random pulse code generator means for locally generating a cyclical pseudo-random pulse code sequence which is essentially identical to said predetermined code sequence;

clock means for supplying clock pulses for stepping said locally generated code sequence through a repetitive phase cycle at a nominal frequency which is offset from said constant clock frequency, whereby said locally generated code sequence tends to slide in one direction into and out of phase alignment with respect to said predetermined code sequence;

mixer means having one input coupled to said transmitter and another input coupled to said code generator means for mixing and spread-spectrum carrier with said locally generated code sequence, whereby said mixer means recovers a despread carrier signal from said spread-spectrum carrier when said locally generated code sequence is phase aligned with said predetermined code sequence;

phase control means coupled between said clock means and said code generator means for regulating the frequency at which said locally generated code sequence is stepped; and circuit means coupled between said mixer means and said phase control code sequence slides into phase alignment with said predetermined code sequence for intermittently triggering said phase control means to phase shift said clock pulses, such that said locally generated code sequence is intermittently phase shifted to counteract its tendency to slide out of phase alignment with said predetermined code sequence, thereby substantially preserving the phase alignment of said locally generated and predetermined code sequences.

2. The receiver of claim 1 wherein said nominal clock frequency is offset from said constant clock frequency in a predetermined sense, such that the phase of said local generated code sequence tends to slide in a predetermined direction relative to the phase of said predetermined code sequence, and said circuit means monitors said phase alignment and triggers said phase control means to shift the phase of said locally generated code sequence in the opposite direction relative to the phase of said predetermined code sequence whenever said circuit means senses a loss of said phase alignment.

3. The receiver of claim 1 wherein said circuit means includes a demodulator coupled to said mixer means for demodulating said despread carrier signal to recover said data, and a lock detector means coupled between said demodulator and said phase control means for triggering said phase control means in response to a degradation of the data recovered by said demodulator.

4. The receiver of claim 3 wherein said lock detector means includes a noise sensitive threshold detector for triggering said phase control means whenever the recovery of said data is degraded by noise having a time averaged value in excess of a predetermined threshold level.

5. The reciever of claim 3 wherein said data is synchronous data that has a predetermined data rate; and said lock detector means includes a frequency sensitive threshold detector for triggering said phase control means whenever the recovery of said data is degraded by a few near neighboring signal transitions occurring at a rate significantly in excess of said data rate.

6. The receiver of claim 5 wherein said lock detector means further includes a noise sensitive threshold detector for triggering said phase control means whenever the recovery of said data is degraded by noise having a time average value in excess of a predetermined amplitude threshold level.

7. The receiver of claim 1 wherein said circuit means includes adaptive means coupled to said phase control means for cyclically triggering said phase control means at a rate selected to prolong the phase alignment of said locally generated and predetermined code sequences; and monitoring means coupled between said mixer means and said adaptive means for sensing interruptions in the phase alignment of said locally generated and predetermined code sequences once such phase alignment is achieved, said monitoring means adjusting the rate at which said phase control means is triggered by said adaptive means to cause such interruptions to become less frequent.

8. The receiver of claim 7 wherein said monitoring means includes a demodulator coupled to said mixer means for demodulating said despread carrier signal to cover said data, and a lock detector means coupled between said demodulator and said adaptive means for sensing a loss of said alignment whenever the data recovered by said demodulator is significantly degraded.

9. The receiver of claim 8 wherein said lock detector means includes a noise sensitive threshold detector for sensing a loss of said alignment whenever the recovered data is degraded by accompanying noise having a time averaged value in excess of a predetermined threshold level.

10. The receiver of claim 8 wherein said data is synchronous data that has a predetermined data rate; and said lock detector means includes a frequency sensitive threshold detector for sensing a loss of said alignment whenever the recovered data is degraded by having a few near neighboring signal transitions occurring at a rate significantly in excess of said data rate.

11. The receiver of claim 10 wherein said lock detector means further includes a noise sensitive threshold detector for sensing a loss of said alignment whenever the recovered data is data is degraded by accompanying noise having a time averaged value in excess of a predetermined threshold level.

* * * * *